United States Patent

Dykstra et al.

Patent Number: 5,271,654
Date of Patent: Dec. 21, 1993

[54] VISOR MOUNT

[75] Inventors: Steven P. Dykstra, Zeeland; Michael L. Lanser, Holland, both of Mich.

[73] Assignee: Prince Corporation, Holland, Mich.

[21] Appl. No.: 996,843

[22] Filed: Dec. 16, 1992

Related U.S. Application Data

[63] Continuation of Ser. No. 839,930, Feb. 21, 1992, abandoned.

[51] Int. Cl.⁵ .............................. B60J 3/02
[52] U.S. Cl. .......................... 296/97.12; 296/97.9
[58] Field of Search ............ 291/97.1, 97.6, 97.8, 291/97.99, 97.11–97.13

[56] References Cited

U.S. PATENT DOCUMENTS

| | | | |
|---|---|---|---|
| D. 298,427 | 11/1988 | Jonsas | D12/191 |
| D. 305,298 | 1/1990 | De Langie | D12/191 X |
| 1,283,775 | 11/1918 | Howe | |
| 1,808,086 | 6/1931 | Ulp | |
| 2,153,095 | 4/1939 | McKinley | |
| 2,424,500 | 7/1947 | Peltier et al. | |
| 2,617,680 | 11/1952 | Knoblock | |
| 2,665,166 | 1/1954 | Roark | 296/97.9 |
| 2,831,726 | 4/1958 | Ralston | |
| 2,958,559 | 11/1960 | Jensen | |
| 3,837,703 | 9/1974 | Holladay | |
| 3,865,428 | 2/1975 | Chester | |
| 4,130,317 | 12/1978 | Lai | 296/97.9 |
| 4,167,287 | 9/1979 | Franklin et al. | 296/97.6 |
| 4,762,359 | 8/1988 | Boerema et al. | |
| 4,765,674 | 8/1988 | Svensson | 296/97.9 X |
| 4,845,809 | 7/1989 | Pillifant, Jr. | 296/97.8 X |
| 4,890,875 | 1/1990 | Takahashi | 296/97.1 |
| 4,919,469 | 4/1990 | Aizawa et al. | 296/97.11 X |
| 5,011,211 | 4/1991 | Svensson | 296/97.1 |

FOREIGN PATENT DOCUMENTS

| | | | |
|---|---|---|---|
| 2737215 | 4/1978 | Fed. Rep. of Germany | 296/97.1 |
| 1295506 | 5/1962 | France | 296/97.9 |
| 0475136 | 11/1937 | United Kingdom | 296/97.12 |

Primary Examiner—Dennis H. Pedder
Attorney, Agent, or Firm—Price, Heneveld, Cooper, DeWitt and Litton

[57] ABSTRACT

A visor mount for mounting a visor panel to a vehicle roof includes a first member which extends from an edge of the visor panel and a second member which is secured to a roof of the vehicle. The first and second members are pivotally interfit with one another for rotational movement of the visor panel between a raised stored position against the vehicle roof and a lowered use position.

7 Claims, 2 Drawing Sheets

VISOR MOUNT

This is a continuation of application Ser. No. 07/839,930, filed on Feb. 21, 1992, now abandoned.

BACKGROUND OF THE INVENTION

The present invention pertains to a visor for a vehicle and particularly a visor mounting system.

There exists a variety of manners in which visors are mounted to a vehicle for support. Typically, visors include a visor rod having an elbow assembly which is secured to a sheet metal roof support structure of a vehicle for attachment of the visor to the vehicle. Such construction allows movement of the visor between a raised stored position adjacent the headliner and a lowered use position. The elbow assembly also typically allows the visor to be moved from the front windshield position to a side window position. In some multiple visor installations, a pair of mounting brackets are employed in which a primary visor is mounted in the fashion indicated above and an auxiliary visor is mounted, for example, for slidable motion along a rod extending between a pair of spaced visor brackets. U.S. Pat. No. 4,762,359 illustrates such a mounting system for multiple visors. Also, a variety of other mounting bracket assemblies have been suggested, as for example, those shown in U.S. Pat. Nos. 3,865,428 and Des. 298,427. Although these and other such visor mounting assemblies provide the desired visor motion, in many instances they are complicated and therefore expensive to manufacture and prone to failure. Also many older visor designs do not conform to modern day vehicle interior design constraints which require safe and compact mounting of vehicle interior components with clean and unobtrusive lines.

SUMMARY OF THE PRESENT INVENTION

The visor and visor mount of the present invention includes a visor panel and a mounting assembly which mounts the visor panel to the roof of a vehicle above a window such as a windshield for movement between a raised stored position against the vehicle roof to a lowered use position. The visor mount includes a first member which extends from an edge of the visor panel and a second member which is secured to a roof of the vehicle. The first and second members are pivotally interfit with one another for rotational movement of the visor panel between a raised stored position against the vehicle roof and a lowered use position.

In a preferred embodiment, the first member is a clamping member which includes a pair of spaced mounting bosses for receiving ends of pivot axle means which extend from opposite ends of the second member. The axle means allow the visor to rotate between the mounting bosses with a predetermined rotational torque for mounting the visor panel to the roof of a vehicle and allowing its adjustment to a desired lowered use position. Such construction provides a visor mount which is relatively inexpensive, efficient to manufacture and durable providing a stable visor mounting arrangement which can be integrated with the visor panel for mounting to the roof of a vehicle.

In a preferred embodiment of the present invention, the visor mount is employed in connection with a visor system in which a conventional visor is also employed for providing side window protection with the visor mount of the present invention providing front windshield protection when the main visor is moved to a side window position. These and other features, objects and advantages of the present invention will become apparent upon reading the following description thereof together with reference to the accompanying drawings in which:

DETAILED DESCRIPTION OF THE PREFERRED EMBODIMENT

Figure 1:
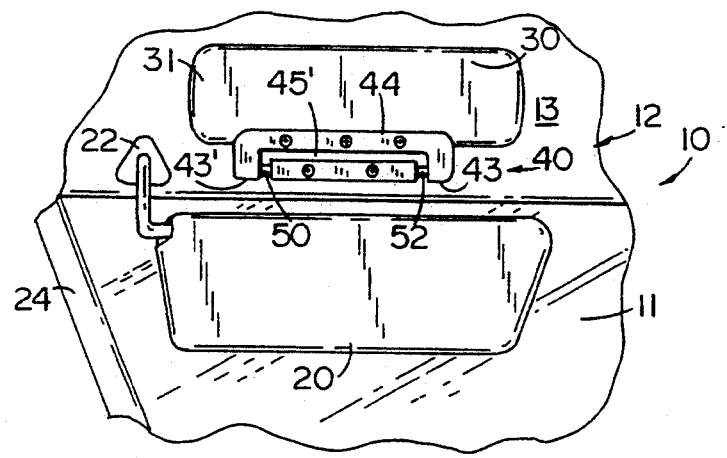
FIG. 1 is a perspective view of a visor installation embodying the present invention shown with the visors in a first position.
Figure 2:
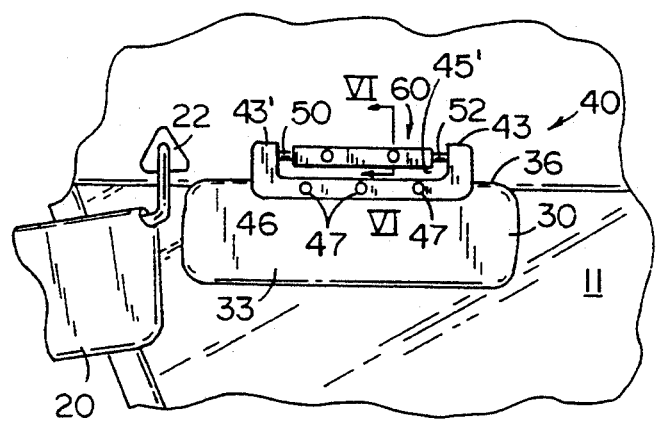
FIG. 2 is a view of the structure shown in FIG. 1 with the visors moved to a second position.
Figure 3:
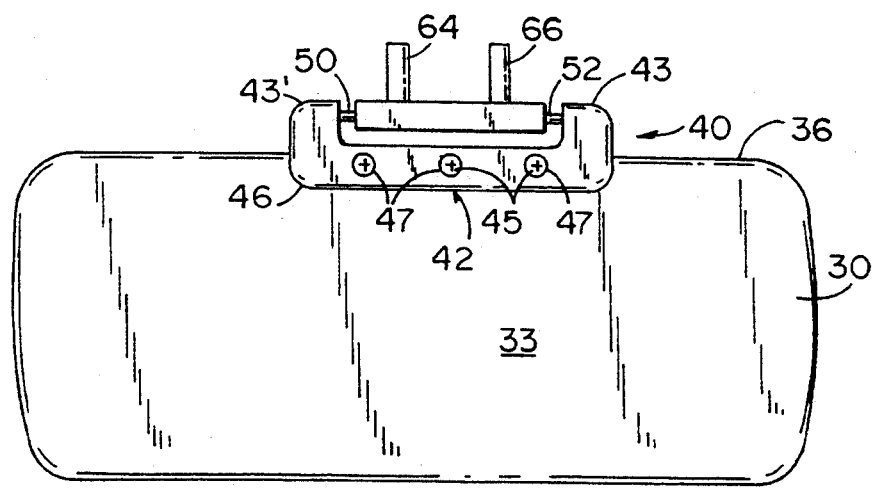
FIG. 3 is an enlarged front elevational view of one of the visors shown in FIGS. 1 and 2.
Figure 4:
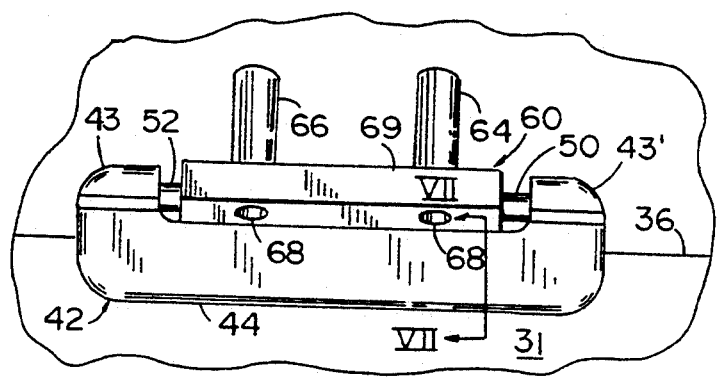
FIG. 4 is an enlarged fragmentary front elevational view of the visor mount shown in FIGS. 1-3.

Referring initially to FIGS. 1 and 2, there is shown a visor system which is mounted in a vehicle 10 such as an automobile. The system shown is located above the windshield 11 on the driver's side of the vehicle. Above the windshield there is a roof section 15 (FIG. 6) of the vehicle covered by a headliner 12 including an upholstery fabric exterior 13 and integrally formed backing member 14. The installation shown in FIGS. 1 and 2 includes a primary visor 20 mounted to the roof support 15 by means of a pivot rod mounting assembly 22 which is mounted slightly above the windshield adjacent the A-pillar 24 of the vehicle. Visor 20 is shown in FIG. 1 in a first lowered use position pivoted downwardly from a raised stored position adjacent the headliner in which it overlies a second or auxiliary visor 30 exposed as seen in FIG. 1 when the first visor is lowered. Visor 30 is mounted to the roof of the vehicle by the visor mounting assembly 40 embodying the present invention. Visor 20 can be pivoted to a side window position as illustrated in FIG. 2 and the auxiliary visor 30 lowered to a front windshield position as also shown in FIG. 2 to provide front window protection with the multi-visor installation in the position shown in FIG. 2.

Figure 7:
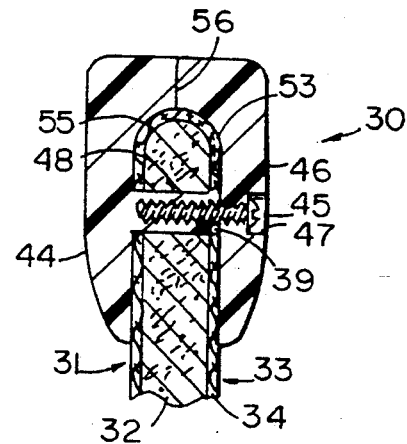
FIG. 7 is a greatly enlarged cross-sectional view taken along section lines VII—VII of FIG. 4.

Visor 30, as best seen in FIG. 7, comprises a visor panel in the form of a planar core 32 which can be made of a suitable fiberboard or polymeric material which is covered by a suitable upholstery fabric 34 to match the decor of the vehicle including that of the headliner upholstery fabric 13. Along an edge 36 of the generally rectangular visor body so formed, there is mounted a first or clamping member 42 of the visor mounting assembly 40 of the present invention. Member 42 is generally U-shaped in cross-section (FIG. 7) having a central leg which extends along edge 36 of the visor body and legs 44 and 46 which extend downwardly on opposite sides of the visor panel and clamp the panel therebetween. Member 42 is also generally U-shaped as viewed in FIGS. 1-4 with upwardly extending mounting bosses 43 and 43, at opposite ends of the central leg. Member 42 clamps to the upper edge 36 of visor panel 32 either during molding of assembly 40 as described below in connection with FIG. 8, or by providing a two-piece member which can be attached and clamped at opposite sides of panel 32.

In the first embodiment shown in FIGS. 1-7, the clamping member 42 includes a first generally rectangular plate 44 mounted on side 31 of visor 30 and a second generally U-shaped member 46 mounted to the opposite side 33 of visor 30. Member 46 includes a pair of spaced mounting bosses 43, 43' at opposite ends for receiving axles 50 and which extend into the mounting member 60. Member 46 includes a generally horizontally extending ledge 53 (FIG. 7) which partially overlies edge 36 of the visor 30 and terminates in a wall 56 which mates with the end of a similar ledge 55 of member 44. Member 46 also includes three recessed apertures 47 which align with integrally formed collars 48 (FIG. 7) on member 44 which project through three aligned apertures 39 in visor core 32. Fastening screws 45 are threadably secured within collars 48 to the backing plate 44. Thus, members 44 and 46 clamp the upper edge 36 of visor body 32 between the members.

Figure 8:
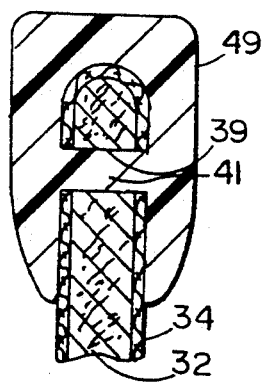
FIG. 8 is a cross-sectional view of an alternative embodiment of the invention.

In the alternative embodiment of FIG. 8, members 44 and 46 are integrally molded as a single member 49 with a section of material 41 extending through each of the apertures 39 in the visor core to lockably mount the generally U-shaped clamping member to the edge of the visor panel. This can be done in a suitable mold which is capable of receiving the edge of the visor within the mold as the polymeric material is subsequently molded around the edge of the visor.

Figure 5:
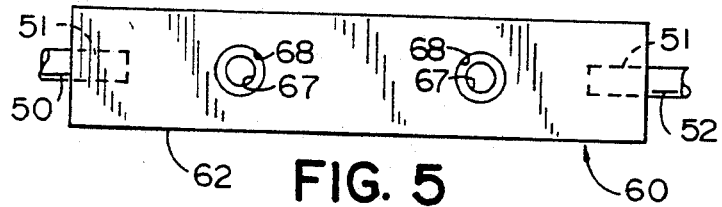
FIG. 5 is a greatly enlarged top plan view of a portion of the visor mount shown in FIG. 4.

In either embodiment, stub axles 50 and 52 are integrally insert molded within members 42 and 60 and face toward one another within the upwardly extending mounting bosses 43 and 43' respectively of either member 46 or the integrally molded member 49. Stub axles 50 and 52 extend partially within the second or mounting member 60 as best seen in FIG. 5 which is molded at the same time as clamping member 42. The inner ends 51 of axles 50 and 52 which extend within the member 60 may include ribs or other projections which lock the stub axles with respect to member 60. The opposite ends of stub axles 50 and 52, however, are smooth and therefore can rotate within the mounting bosses 43 and 43' of member 42 with a predetermined rotational torque such as 6 inch-pounds to allow visor 30 to be lowered to an adjustably selected lowered use position and held in such position until further moved by the vehicle occupant.

Figure 6:
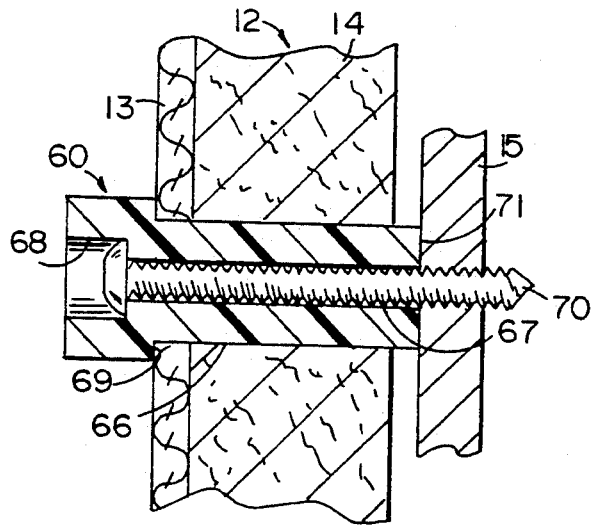
FIG. 6 is a greatly enlarged cross-sectional view taken along section lines VI—VI of FIG. 2.

The mounting member 60 comprises a generally rectangular block which is dimensioned to fit within the U-shaped member 46 between the mounting bosses 43 and 43' leaving sufficient clearance at the opposite ends for the relative rotation of the member within the slot formed by the generally U-shaped member 46 leaving a clearance gap 45' therebetween. Integrally molded with the rectangular body 62 of member 60 is a pair of collars 64 and 66 each with a central aperture 67 extending therethrough. Communicating with aperture 67 is a cylindrical recess 68 for countersinking a fastening member such as a Phillips head screw 70 (FIG. 6) which extends into the recessed aperture 68 for securing mounting member 60 to the metal roof 15 of the vehicle. The collars 64 and 66 serve to space the mounting surface 69 of mounting member 60 immediately adjacent the headliner upholstery surface 13 as seen in FIG. 6 when the opposite end 71 of collars 64 and 66 abut the facing surface of the roof support member 15. The length of collars 64 and 66 is thus selected for a given vehicle so that the headliner area adjacent the mounting member 60 is not inwardly depressed when the screws 70 are tightened to mount the visor to the vehicle.

In the preferred embodiments, the mounting member and clamping member were of a suitable polymeric material to yield the desired rotational torque for the insert molded steel axle means 50 and 52. As is known, material such as polypropolene or an acetal such as CELCON can be used to provide the desired structure and function. In some embodiments it may be desirable to mold the visor 30 of the same material and in such case, the mounting assembly 40 can be integral with the visor itself.

It will become apparent to those skilled in the art that various modifications to the preferred embodiments can be made. Thus, for example, the U-shaped and block-shaped members can be reversed to provide a mounting member for the vehicle which is U-shaped and a clamping member for the visor which is block-shaped and fits within the U-shaped mounting member. This reversal of parts and other modifications to the preferred embodiment will become apparent to those skilled in the art and will fall within the spirit and scope of the invention as defined by the appended claims.

The embodiments of the invention in which an exclusive property or privilege is claimed are defined as follows:

1. A visor mount for a vehicle comprising:

a one-piece clamping member including a pair of spaced mounting bosses extending from opposite ends of a central leg, said mounting bosses and said central leg defining a generally U-shaped longitudinal configuration, said clamping member being integrally molded around an edge of a generally rectangular planar visor panel, the visor panel including at least one hole adjacent the edge, said leg of said one-piece clamping member extending around the edge and through the hole, such that said leg includes an internal, continuous unsegmented surface circumscribing said edge and extending through the at least one opening, said surface contacting the visor panel along substantially the entire length of said surface;

a mounting member for mounting to a vehicle roof and extending between said mounting bosses of said clamping member, said mounting member including spaced collars for spacing said mounting member from a vehicle roof and for attaching said mounting member to a vehicle roof; and axle means extending between said clamping member and said mounting member for providing a predetermined rotational torque for said visor panel for movement between a raised stored position and a lowered use position.

2. A visor mount for mounting a visor panel to a vehicle comprising:

a first member including a pair of spaced mounting bosses extending from opposite ends of a central leg to define a generally U-shaped longitudinal member, said first member integrally molded around an edge of the visor panel and through a hole in the visor panel adjacent the edge such that said first member defines a continuous, uninterrupted, and unsegmented surface circumscribing said edge and through the visor panel, said member contacting said visor panel along substantially the entire length of said surface;

a second member for mounting to a vehicle roof and said first member; and axle means extending between said first and second members for providing a predetermined rotational torque for said visor panel for movement between a raised stored position and a lowered use position.

3. A visor mount for a vehicle comprising:

a one-piece clamping member defined by a pair of spaced mounting bosses extending from opposite ends of a central leg, said clamping member being generally U-shaped longitudinally, said U-shaped clamping member integrally molded around an edge of said a visor panel such that it comprises a unitary piece having a front portion and a back portion integrally joined together by at least one connecting portion extending uninterrupted through an aperture in the visor panel to form a continuous, uninterrupted surface circumscribing said edge of the visor panel and through the aperture;

a mounting member for mounting to the vehicle roof and extending between said mounting bosses of said U-shaped member, said mounting member including spaced collars for spacing said mounting member from a vehicle roof and for attaching said mounting member to a vehicle roof; and axle means extending between said U-shaped member and said mounting member for providing a predetermined rotational torque for said visor panel for movement between a raised stored position and a lowered use position.

4. The apparatus as defined in claim 3 wherein said axle means are set into said mounting member and said U-shaped clamping member to provide a predetermined rotational torque to said visor panel when installed in a vehicle.

5. A vehicle visor comprising:

a generally planar visor body having a perimeter including opposite sides with a top edge extending therebetween;

a mounting member integrally molded around a portion of said top edge of said visor and including legs which extend over said edge for engaging opposite sides of said visor body, said member including an integral continuous section extending through said hole in said visor body between said legs, said section being continuous, unsegmented and integral with said legs, to secure said mounting member to said visor body;

a pivot mounting member including means for receiving a pivot axle and means for attaching said pivot mounting member to the roof of a vehicle; and pivot axle means extending between said mounting member and said pivot mounting member to allow said visor body to pivot between a raised stored position and a selected lowered use position.

6. The apparatus as defined in claim 5 wherein said mounting member is generally U-shaped in cross-section with said legs extending integrally from a central leg.

7. The apparatus as defined in claim 5 wherein said mounting member includes a pair of mounting bosses at opposite ends of said central leg which extend in a transverse direction away from said central leg and wherein said pivot axle means extends from said mounting bosses to said pivot mounting member.

* * * * *